United States Patent [19]

Steele

[11] 3,862,234

[45] Jan. 21, 1975

[54] AMINE RECOVERY

[75] Inventor: Charles Sam Steele, Nederland, Tex.

[73] Assignee: Jefferson Chemical Company, Inc., Houston, Tex.

[22] Filed: June 12, 1973

[21] Appl. No.: 369,219

[52] U.S. Cl. .......................... 260/585 A, 260/583 N
[51] Int. Cl. ....................... C07c 85/04, C07c 85/16
[58] Field of Search ..................... 260/583 N, 585 A

[56] References Cited
UNITED STATES PATENTS 3,202,713  8/1965  Marullo .......................... 260/583 N

FOREIGN PATENTS OR APPLICATIONS 968,142  8/1964  Great Britain .................. 260/585 A
735,779  8/1955  Great Britain .................. 260/585 A Primary Examiner—Lewis Gotts
Assistant Examiner—D. R. Phillips
Attorney, Agent, or Firm—James L. Bailey; John R. Kirk, Jr.

[57] ABSTRACT

Ethylene amines are manufactured by a process wherein ethylene dichloride is reacted with ammonia and the mixture is stripped of unreacted ammonia. Sodium hydroxide equivalent to the chloride present is added and large quantities of sodium chloride result. Part of the ethylene amines product is lost when this salt is separated from the product amines. Recovery of the ethylene amines from the salt and production of a substantially amine-free salt is accomplished by the disclosed process involving the recrystallization of the process salt to recover the amines and produce a salt free of organic pollutants.

8 Claims, 2 Drawing Figures

3,862,234

AMINE RECOVERY

BACKGROUND OF THE INVENTION

The field of this invention relates to the recovery of amines from sodium chloride salt produced in a process for the production of ethylene amines by the reaction of ethylene dichloride with ammonia.

It is well-known to prepare ethylenediamine and its higher homologs by the reaction of ethylene dichloride with ammonia. At times, the demand for the higher homologs, such as diethylenetriamine, triethylenetetramine, and tetraethylenepentamine, and the like, is greater than the demand for ethylenediamine. Recovery of these higher homologs is important.

When ammonia is reacted with ethylene dichloride, hydrogen chloride is a byproduct of the reaction. This hydrogen chloride immediately reacts with amines to form the amine hydrochloride. It is necessary to regenerate the amine from the hydrochloride. This is generally done by neutralization of the crude reaction mixture with sodium hydroxide, resulting in the formation of large amounts of sodium chloride which must be separated from the amines. A basic process using this technology for the production of ethylenediamine is discussed in U.S. Pat. No. 3,394,186, for example.

While most of the product amines are commonly recovered after neutralization by a steam stripping operation, a number of disadvantages result, such as the loss of higher homologs in the sodium chloride residue and the large percentage of water which must be dried from the amine product. U.S. Pat. No. 3,448,152, describes a process for effecting amine recovery by adding a water immiscible solvent for the amine product to the salt. The water is then removed by distillation, sodium chloride by filtration or centrifugation, and the solvent and amine products are separated by a suitable means, such as azeotropic distillation or solvent extraction. While this process has been found to substantially improve the recovery of amine product from the ethylene amines process, the resulting salt cake from the filtration or centrifugation still, typically, has from about 1 wt.% to about 10 wt.% of amine product trapped with the salt, representing a substantial loss, up to as much as 20%, of saleable product. To further complicate matters, the total organic carbon content (hereinafter TOC) of even a 1% solution amounts to about 5,000 parts per million, far above any pollution standards set for disposal of brine into brackish coastal waters. The recovery of amines must be such that a 10% brine solution would have a TOC of less than about 100 parts per million and preferably less than 50 ppm. In other words, there must be substantially quantitative recovery of the amine from the salt.

Many attempts have been made to dispose of, or render inocuous, the salt cake or brine resulting from the ethylene amines process, even the suggestion of undesirable disposal by a deep well injection of the material into subsurface formations. Calcination of the salt, of course, would remove the organic material and create a disposable salt. Obviously this solution is unacceptable since the valuable amine product is destroyed and a possible air pollution problem is created by the nitrogen oxides formed in the calcination.

Accordingly, it is the object of this invention to recover ethylene amines polluting the salt cake effluent from the ethylene amines process to create a disposable salt cake free of amine organic materials.

It is a further object of this invention to recover saleable ethylene amines from the amines trapped by the salt cake produced in the ethylene amines process. It is a special object of this invention to provide a salt or brine substantially free of amine which can either be recaptured for reuse or disposed of without harm to the ecology.

SUMMARY OF THE INVENTION

Amine contaminants of the salt cake effluent of the process for the production of ethylene amines by the reaction of ethylene dichloride with ammonia are recovered by making a concentrated solution from the salt cake of the ethylene amines process and evaporating water from the solution in a crystallizer to cause salt crystals to grow and migrate to the bottom of the crystallizer where they are removed and pumped to a centrifuge which separates the amines in a filtrate stream from the salt crystals, which, after being washed with water in the centrifuge, are now substantially pure of amine. This filtrate stream, even though it still contains some salt, can be returned to the amine recovery section of the ethylene amines unit for recovery of the saleable product, which, before this invention, was lost in the brine. The salt cake removed from the centrifuge is substantially dry and contains only about 0.02 wt.% or less amine. A 10% brine made from such salt cake would contain less than 100 ppm TOC and often less than 50 ppm.

DESCRIPTION OF THE PREFERRED EMBODIMENTS

To set the stage for the description of the process improvement of this invention, it is well-known to prepare ethylenediamine and its higher homologs, the polyethylene polyamines, herein called ethylene amines, such as diethylenetriamine, triethylenetetramine, tetraethylenepentamine, and the like, by the reaction of ethylene dichloride with ammonia. When ammonia is reacted with ethylene dichloride, hydrogen chloride is a by-product of the reaction. This hydrogen chloride immediately reacts with the amines produced, to form the amine hydrochlorides. It is necessary to regenerate the amine from the hydrochloride by neutralization of the crude reaction mixture with sodium hydroxide. Of course, this results in the formation of large amounts of sodium chloride which must be separated from the amines. Water is evaporated overhead and the brine, salt crystals and the amines, are sent to a centrifuge wherein the filtrate and wash water is removed carrying the amine product, leaving a salt cake contaiminated with some of the amine product. This salt cake is then usually converted to an approximately 20% brine for disposal. However, since the salt in this brine typically contains from about 1 to about 10 wt.% of amine, normal disposal procedures cannot be followed for ecological considerations. It is the disposal of this salt cake contaminated with amine to which this invention is addressed and the recovery of the amine as a saleable product.

Figure 1:
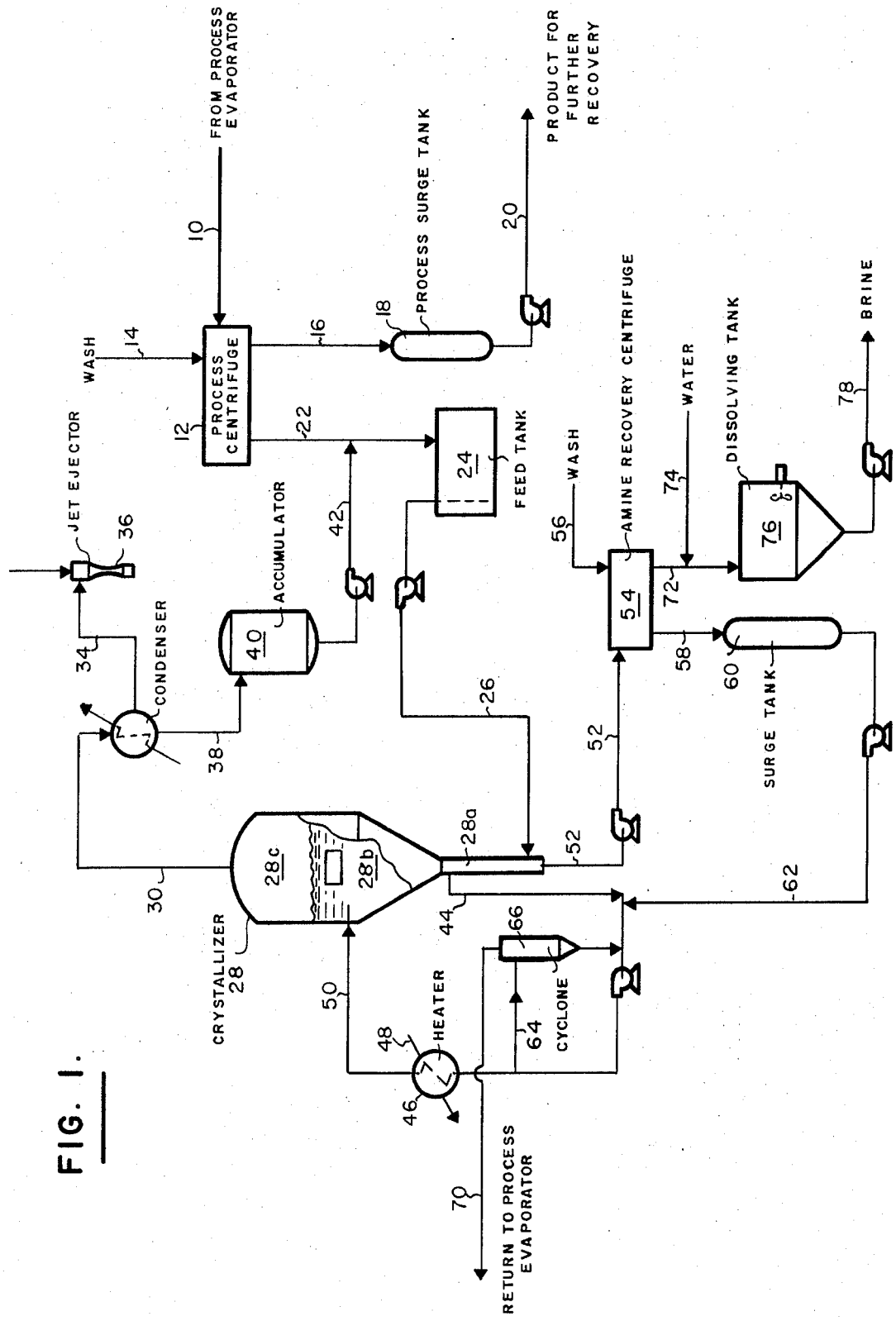
FIG. 1 is a schematic diagram, omitting common fittings and valves, showing the process of the invention operating as a single effect crystallizer system.

Turning now to FIG. 1 depicting a single effect crystallization amine recovery system, the stream containing the aqueous salt slurry contaminated with amine coming from the process evaporator enters through line 10 into an existing process centrifuge 12 equipped such that the salt cake may be washed by water entering through line 14. The filtrate, including the wash water, exits the process centrifuge 12 through line 16 and contains the product amine to be further purified through the existing process. This material passes through process surge tank 18 and is pumped back to the process for further purification through line 20. The salt cake to be treated in the process of this invention exits the existing process centrifuge 12 through line 22 and thence into feed tank 24, where the solution to be treated in the process of this invention is produced from the salt cake and a water stream hereinafter defined. It is also within the scope of this invention to use a supplemental water stream or other process water streams containing a small amount of amine for recovery which would otherwise present disposal, and hence, pollution, problems for the operation of the ethylene amines process.

The feed produced in tank 24 would contain approximately 1 to 3% by weight amine and about 25% sodium chloride with a small amount of sodium hydroxide which was unreacted in the neutralization of the amine hydrochlorides in the process. The amine concentration in this feed can vary widely in the practice of this invention, bearing in mind that a concentration of approximately 17 wt.% amine is desirable to effect recovery as product in the ethylene amines process itself. Since the salt cake being charged to the feed tank 24 through line 22 typically contains about 82% sodium chloride and about 7% amines contaminant, the salt in the feed stream, when reduced to an easily pumpable 20 to 30% by weight salt, causes a consequent reduction in the amine content of the feed. While the amount of amine contaminants entering the feed tank with the salt somewhat control the amine content being charged to the recovery system of this invention, feeds containing as high as about 15 wt.% amines have been treated, the salt cake removed from the amine recovery system of this invention was substantially free of amine contaminants and could be considered to be in acceptable limits permissible for disposal or reuse.

After complete processing of the feed through the system of this invention, 10% brine solutions produced from the salt cake were found to have less than 100 ppm TOC and with prewashing of the crystals in the crystallizer, as hereinafter described, produced 10% brine solutions having less than 50 ppm TOC even when a feed of as high as 15 wt.% amine is used.

The feed solution exits the feed tank 24 through line 26 and enters crystallizer 28 near the bottom of the crystallizer leg 28a, where it flows countercurrent to the salt crystals, thereby washing the crystals and increasing in amine content of the aqueous slurry. The feed then becomes a part of the mother liquor in a crystallizing zone 28b and water is removed in an evaporation zone 28c, which is kept under vacuum.

The crystallizer is operated in a manner such that the mother liquor in the crystallization zone 28b is maintained at a temperature from about 140° to about 220°F but preferably, to about 155°F depending upon the pressure in evaporation zone 28c. The water vapors produced in the evaporation zone 28c exit the crystallizer 28 through line 30 to a condenser 32, where the overhead stream of water and some lower boiling amine contaminants are condensed. The noncondensable materials exit the condenser 32 through line 34 to a jet ejector 36, which serves to maintain the vacuum on the evaporation zone 28c. The jet ejector is operated in a manner well-known to those skilled in the art to maintain an absolute pressure within the evaporation zone 28c of from 100 to about 760 mm mercury.

The water and amines condensed in the condenser 32 exit through line 38 to an accumulator 40, from which they are pumped through line 42 to mix with the salt cake in line 22 or feed tank 24 from the process centrifuge 12. It is, therefore, seen that an attempted separation of the overhead water from any amine material which may come overhead from the crystallizer 28 is avoided since such amine would be returned to the feed solution during the make up of said solution. This also avoids the discharge of a polluting stream.

In the operation of the crystallizer 28, supernatant mother liquor is withdrawn from the crystallizing zone 28b through line 44 and proceeds to a heater 46 wherein the material is heated to the temperature necessary to maintain the temperature in the crystallizing zone 28b of the crystallizer 28. The amount of mother liquor in the stream 44 is selected to provide sufficient flow to maintain the temperature in the crystallizing zone. The heater can be of any suitable means to accomplish this result, but a heater charged with steam through line 48 is shown on FIG. 1. The heated liquor is returned to the crystallizing zone 28b through line 50.

The crystallized salt is withdrawn from the bottom of the crystallizer leg 28a through line 52 and is pumped to the amine recovery centrifuge 54. While any suitable centrifuge equipped with a water wash can be used, it is preferred in the practice of the amine recovery system of this invention to use a pusher type centrifuge with wash water entering through line 56. The use of wash water in the centrifuge is important to achieve substantially complete recovery of the ethylene amines product, as well as to complete the cleaning of the salt cake. The wash rate preferably varies from about 0.03 pounds water per pound of salt cake to about 0.35 pounds water per pound of salt cake. Greater amounts of water are unnecessary.

The filtrate, including the wash water, exits the centrifuge through line 58 through surge tank 60 and thence is pumped through line 62 where it joins the mother liquor recycle stream in line 44. The filtrate in line 62 contains approximately 5% by weight of amine and approximately 25% by weight of the salt. A portion of the recycle stream in line 44, after being combined with the filtrate in line 62, is drawn off in line 64 where it enters a cyclone 66, producing a salt-rich stream which is returned through line 68 to the recycle stream 44. The salt-poor stream, being amine-rich, exits the cyclone 66 through line 70 where it is returned to the ethylene amines process process evaporator as a portion of the feed. The amine-rich stream 70 contains approximately 17% amine product, which can be recovered in the process evaporator, and thus increasing the productivity of the ethylene amines unit as a whole.

Returning to the amine recovery centrifuge 54, the salt cake produced, being substantially free of any amine contaminant, exits the centrifuge 54 through line 72, and contains only about 2 to about 3 wt.% water. The amine content of the salt has been found to be about 0.02 wt.%. If desired, the salt can be disposed of, or reused, in this near dry state, or can be combined with water entering through line 74 in a dissolving tank 76 to produce a brine solution exiting through line 78. When a 10 wt.% brine solution exits through line 78, we have found that the TOC of said brine is well under 100 ppm and, most often, depending on the amount of water wash, is less than 50 ppm. Such a brine is often acceptable for use in other parts of an installation where brine is used, or is acceptable for disposal into brackish coastal water.

As can be seen from the foregoing discussion of a single effect recrystallization of brine and amine recovery through the process of this invention, not only is a disposable salt produced from a heretofore totally unacceptable material, but the productivity of the ethylene amines from the process is also materially increased, sometimes by as much as 20%, by a substantially quantitative recovery of the amine previously lost from operations of the ethylene amines process.

Figure 2:
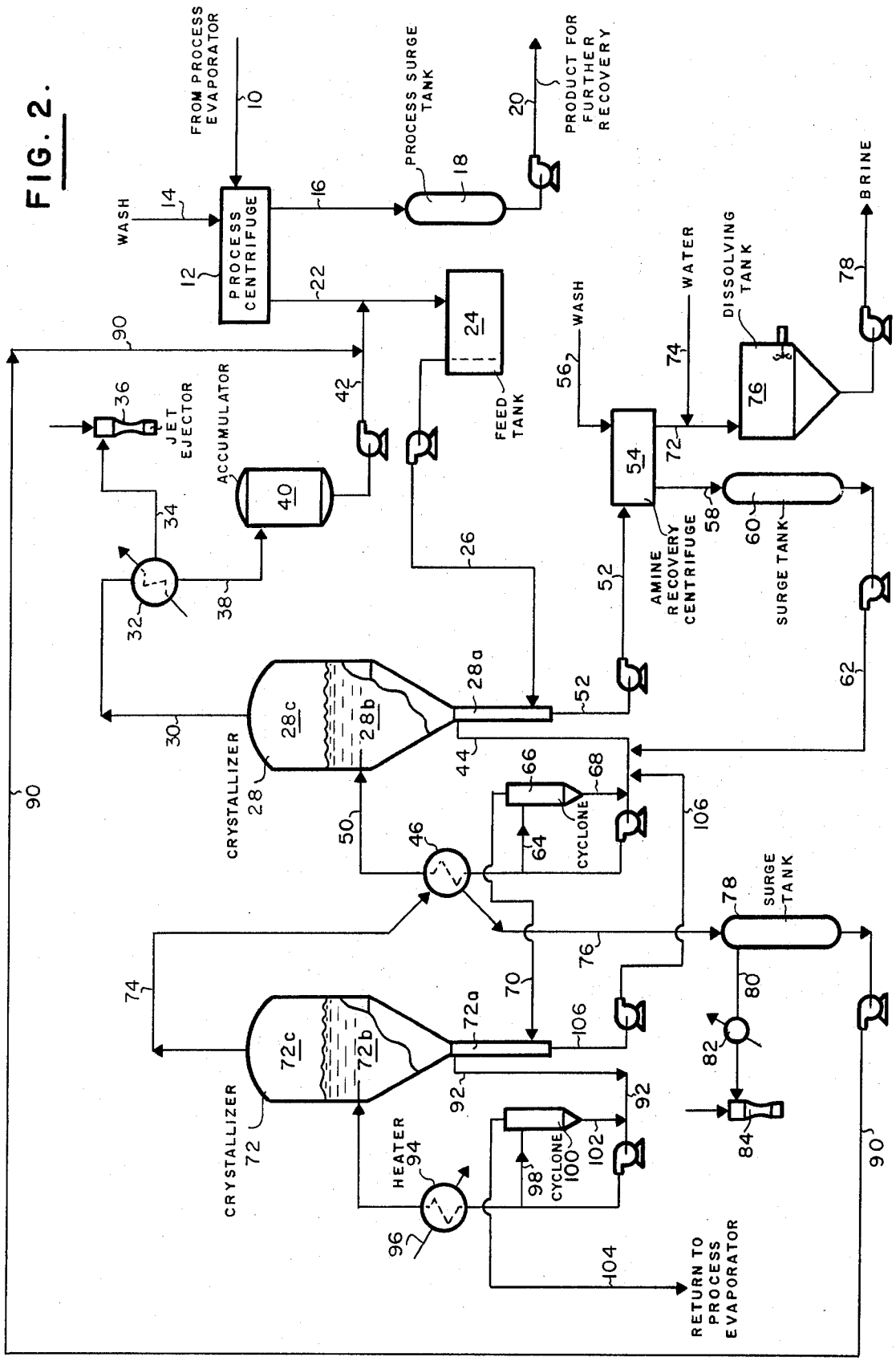
FIG. 2 is a schematic diagram, omitting common valves and fittings, showing the operation of the process of the invention employing a double effect crystallizer in the system.

While outstanding results can be achieved operating in a single effect mode as described above, it is preferred that a multiple effect crystallization system be used. FIG. 2 depicts schematically a double effect crystallizer system. One of ordinary skill in the art would understand how to modify the double effect system to a system whereby more than two crystallizers are incorporated by considering the drawings and the following discussion. From an overall standpoint, it is the preferred embodiment of this invention to operate in the double effect system. In describing the double effect system, all lines and equipment common to the single effect system are numbered with the same number and serve the same purpose as in FIG. 1 and described heretofore. Therefore, in the following discussion of the double effect system, only the additional lines, equipment and differences will be discussed.

In the single effect system, line 70 exiting the cyclone and being rich in amine but poor in salt, returned an amine stream to the ethylene amines process for recovery of the ethylene amines. In the double effect system, this stream, line 70, is the feed charged to crystallizer 72 in the base of the crystallizer leg 72a and forms a wash for the crystals of salt produced in the crystallizer. The feed flows countercurrent into the crystallizing zone 72b, forming part of the mother liquor for the formation of crystals. Water is evaporated in the evaporation zone 72c and is removed through line 74 to the heat exchanger 46 (used as the mother liquor recycle heater for the single effect system) wherein the overhead stream, being hot vapors of water and low boiling amines, forms a heat source for the mother liquor recycle in the first crystallizer 28. The vapors, now cooled somewhat, proceed from the heat exchanger 46 through line 76 to a surge tank 78, where the liquid condensed in the heat exchanger 46 collects. Noncondensables are removed through line 80, connected to a condenser 82 and jet ejector 84 which maintains a suitable vacuum on the evaporator zone 72c of the crystallizer. Alternatively, the condenser 82 can be located in line 76, but the configuration shown in FIG. 2 is preferred. The condensed water and amine proceeds from the surge tank 78 through line 90, to join condensate line 42 from the overhead of the first crystallizer 28, and goes to form a part of the feed make-up water in tank 24 with the salt from line 22.

The crystallizer 72 is equipped with a recycle line 92, where mother liquor withdrawn from the crystallizing zone 72b is heated to the temperature necessary to maintain the crystallizer temperature in the crystallizing zone 72b at the desired temperature, by circulating through the heater 94, which is heated with steam charged through line 96. A portion of the recycle material in line 92 is diverted through line 98 to a cyclone 100, operating in the same manner as the cyclone in the single effect system, to produce a salt-rich, amine-poor stream 102, which is returned to the recycle line 92, and a salt-poor, amine-rich stream, which exits the cyclone through line 104 to be returned to the ethylene amines process to recover amines. In operating in the double effect crystallizer mode, this amine stream 104 contains approximately 25% amine, and therefore, represents a more efficient stream from which to recover additional product amine in the ethylene amines process evaporator.

The crystallized salt is removed from the salt leg 72a of the crystallizer 72, through line 106, where it is returned to the recycle line 44 of crystallizer 28 in the first effect of the double effect mode.

The advantageous effect of the operation of the process of this invention is further illustrated by the following examples, which are set forth for purposes of instruction concerning the recovery of additional product amine hitherto unrecoverable from the salt produced in the process for the manufacture of ethylene amines. The foregoing description and the following examples also illustrate the advantage of the process in recovering a salt cake, or brine, which is substantially free of amine and having total organic carbon content of less than 100 ppm and, most often, less than 50 ppm.

In the Examples which follow, the crystallization of sodium chloride was carried out in a forced circulation evaporative type crystallizer. This unit was 2 feet in diameter in the vapor head, 12 feet long, and fabricated of type 316 ELC stainless steel. The unit is closed with a dished-head top and a 60° cone at the bottom, terminating in a 6-inch diameter flanged piece. The crystallizer was equipped with a 4-inch diameter tangential inlet and a 6-inch side liquor outlet. A 12-inch diameter heating element, containing 36 1-inch OD by 16 BWG by 6 feet long type 316 stainless steel welded tubes providing 50 square feet of heat transfer surface area on the internal, or liquor side of the tubes, was used to maintain the temperature of the mother liquor. The crystallizer was equipped with a centrifugal pump to be used to circulate the liquor between the body and the heat exchanger. Vapor produced in the crystallizer is condensed in a 12-inch diameter vertical surface condenser. The noncondensables are removed from the condenser and are passed through a 6-inch diameter precooler directly into a vacuum system, produced by a Schutte & Koerting water jet eductor. The unit was fully instrumented which consisted of a Foxboro recording steam flow controller, a Foxboro liquid level controller and a Foxboro absolute pressure recorder controller.

The centrifuge was a Swenson KM, Model No. SZ-30 pusher centrifuge with a capacity of 93 cubic feet per hour. The feed slurry was carried by the feed pipe to the feed cone, where the slurry was accelerated to the basket speed. The slurry is then deposited on the screen where primary separation of the solids and liquor is accomplished. The pusher plate, which is splined to the basket shaft, moves the dewatered material forward in the basket, where washing and final dewatering is done prior to discharge of the material from the centrifuge.

For the purposes of the following examples, an initial charge to the evaporator described above was prepared by mixing approximately 45 gallons of a solution containng 9.3% by weight NaCl and about 25 wt.% amine with approximately 285 gallons of a slurry containing 23.8% by weight NaCl and approximately 2.2 wt.% amine, to form a feed of 330 gallons, containing 4.55% by weight amine. A second charge was prepared by mixing approximately 65 gallons of the 25% amine solution and approximately 485 gallons of the 2.2% amine solution, resulting in a solution containing 3.9% amine.

EXAMPLE 1

The purpose of this Example was to obtain a representative sodium chloride crystallized from the solution of approximately 8.5% by weight amine. Approximately 185 gallons of the initial charge was pumped into the forced circulation crystallizer body. As soon as the body was filled, the circulating pump was started, to provide approximately 360 gallons per minute circulation. Vacuum was then applied to the crystallizer to hold the body temperature of about 140°F, and steam was applied to the heat exchanger to evaporate water, concentrate the amines and crystallize sodium chloride. While concentrating the charge in the body of the crystallizer, the discharge from the crystallizer remained closed and the overhead condensate was discarded. After about 7½ hours the initial charge was exhausted and the amine concentration reached 8.3 wt.%. Then the second charge, described above, was used as feed and discharge of the crystallized salt slurry began. The slurry was discharged into the feed tank, and the condensate from the surface condenser added back to the feed tank to dilute the slurry to feed concentration so the system could be operated in a closed loop until equilibrium with respect to salt crystal size and shape was obtained at this amine concentration. After 17 hours of operation in the foregoing manner, the slurry having an amine content of about 8.9 wt.% was discharged to a separate tank to collect the salt crystals produced during the foregoing operation, and the condensate, about 0.31 wt.% amines, from the surface condenser was collected for disposal. After an additional 5 hours of operation and collecting the slurry discharge, the second charge was exhausted and the remaining slurry was left in the body of the crystallizer with the circulating pump continuing to operate.

The slurry, containing the sodium chloride crystals which were grown during the run, was pumped to the centrifuge feed tank and solids allowed to settle to the bottom of the tank. A portion of the mother liquor was decanted and collected, so the resulting slurry was approximately 60% solids by apparent settled volume. The mother liquor contained about 9.3 wt.% amine. A propeller mixer was used to maintain constant slurry concentration, and a Moyno pump was used to pump the slurry from a bottom opening of the feed tank to the centrifuge for the first centrifuge test. The feed rate was such that the centrifuge produced salt cake at the rate of 2040 pounds per hour. While the slurry was being centrifuged, the wash rate with water was varied, with the filtrate, as discharged, recovered to determine production rates. Salt was collected for each wash rate, and 10% by weight solutions of these crystals were made for analysis of the TOC of the resulting solution. The results of this test are shown in Table I.

TABLE I

| Wash Rate No. water/No. Salt Cake | TOC,PPM of 10% Brine | % Moisture in Salt Cake |
|---|---|---|
| 0.0 | 240 | 2.1 |
| 0.055 | 41 | 2.2 |
| 0.11 | 28 | 2.4 |
| 0.192 | 13 | 2.0 |
| 0.239 | 15 | 3.0 |

A second run using the slurry of sodium chloride crystals produced in the crystallizer in this Example, was made to determine the effect of a wash leg prior to centrifuging. To simulate the effect of a wash leg, the 2.2 wt.% amine solution, used in making up the charges to the crystallizer, was added to the slurry removed from the crystallizer, until the mother liquor contained roughly 30% of the original mother liquor, and 70% of the 2.2% amine solution. After mixing, the agitation was suspended and the solids were allowed to settle in the bottom of the centrifuge feed tank. A portion of the mother liquor having an amine concentration of 3.27 wt.% was decanted. This indicated that approximately 82% of the 9.3 wt.% mother liquor was displaced by the 2.2% amine solution. The resulting slurry was approximately 60% solids by apparent settled volume and the slurry was then centrifuged, as described above, except that the rate of cake formation was 2520 pounds/hour. The results of the analysis of the 10% brine solution produced and collected in the manner described in the previous test are reported in Table II.

TABLE II

| Wash Rate No. water/No. Salt Cake | TOC,PPM of 10% Brine | % Moisture In Salt Cake |
|---|---|---|
| 0.0 | 86 | 1.5 |
| 0.048 | 31 | 2.4 |
| 0.083 | 16 | 2.5 |
| 0.139 | 10 | 3.1 |
| 0.16 | 11 | 2.5 |
| 0.18 | 9 | 2.4 |
| 0.195 | 10 | 2.1 |

It will be seen from the analysis of the amines in this feed test to the centrifuge that a substantial amount of the amine was removed when the mother liquor was decanted after adding the 2.2% amine solution, as evidenced by the reduction of the amines in the mother liquor from 9.3% by weight to 3.27% by weight.

EXAMPLE 2

The filtrate and decanted mother liquor from the centrifuge runs described in Example 1 were collected and the 2.2% by weight amine used in the initial feed was added to reduce the concentration to approximately 4.9% amines. Using the resulting solution as a feed, the evaporator was operated under closed loop conditions for about 5 hours until equilibrium was obtained, with the mother liquor having an amine content of 8.8% by weight. Slurry discharge and condensate removal were then initiated. After 5 hours, the feed solution was exhausted and the run was terminated.

A centrifuge run was then conducted, as described in the first centrifuge test of Example 1, with the results being reported on Table III. The decanted mother liquor analyzed at 9.25% by weight amine. The feed rate was such to produce 2060 pounds salt/hour.

TABLE III

| Wash Rate No. water/No. Salt Cake | TOC, PPM of 10% Brine | % Moisture In Salt Cake |
|---|---|---|
| 0.00 | 200 | 2.0 |
| 0.056 | 52 | 1.6 |
| 0.103 | 30 | 2.6 |
| 0.146 | 17 | 1.7 |
| 0.193 | 13 | 2.1 |

A centrifuge test was then run, duplicating the results of centrifuge test of Example 1, involving the simulated wash leg, prior to centrifuging using the 2.2% amine feed slurry, with the results being reported in Table IV. The decanted mother liquor contained 3.67 wt.% amines.

TABLE IV

| Wash Rate No. Water/No. Salt Cake | TOC, PPM of 10% Brine | % Moisture In Salt Cake |
|---|---|---|
| 0.00 | 84 | 1.1 |
| 0.050 | 30 | 2.0 |
| 0.086 | 17 | 2.3 |
| 0.130 | 12 | 2.1 |
| 0.170 | 7 | 2.0 |

EXAMPLE 3

This run was made to obtain representative sodium chloride crystallized from a solution of approximately 15 wt.% amine. The filtrate and decanted mother liquor from the centrifuge runs of Example 2 were collected and a total of 800 gallons of 2.2% amine feed was added. Using the resulting solution as feed of 6.8 wt.% amines, the evaporator, containing slurry remaining from Example 2 having an amine content of 9.9 wt.%, was operated with the removal of condensate from the surface condenser, removal of solid sodium chloride crystallized during concentration, and recycle of feed product mother liquor to the feed tank to increase the amine concentration. When the mother liquor in the evaporator body of the crystallizer contained approximately 15% by weight amine, the system was operated closed loop, as described in Example 1, until salt crystal equilibrium was obtained at this amine concentration. The concentration of amine required about 10 hours of operation and equilibrium was obtained after about 11 hours of closed loop operation. Slurry discharge was then initiated to a separate tank and disposal of the condensate was initiated, and after a run of 1½ hours, the feed solution was exhausted and the material in the evaporator was pumped to the product slurry tank to obtain additional sodium chloride crystals to use in the centrigfuge tests.

This slurry was thickened and centrifuged, as described in the first centrifuge run of Example 1, to determine the effect of centrifuge washing on the amine concentration of the sodium chloride crystals produced in this Example 3. The decanted mother liquor had an amine content of 17.2%. The results of this run are set forth on Table V.

TABLE V

| Wash Rate No. Water/No. Salt Cake | TOC, PPM of 10% Brine | Moisture In Salt Cake |
|---|---|---|
| 0.00 | 431 | 2.6 |
| 0.064 | 114 | 1.8 |
| 0.113 | 68 | 1.1 |
| 0.169 | 46 | 2.3 |
| 0.225 | 32 | 1.5 |
| 0.281 | 29 | 1.8 |

The rest of the sodium chloride crystals produced in this Example 3 were prepared to simulate the wash leg prior to centrifuge of the crystals. Since one-half of the slurry was used in the preceding centrifuge step, the remainder of the material was mixed with the approximately 2% by weight amine feed solution, as described in the second centrifuge run of Example 1, and the resulting slurry was centrifuged and thickened, as described in Example 1. The mother liquor contained 5.8 wt.% amine. The results are reported in Table VI.

TABLE VI

| Wash Rate No. Water/No. Salt Cake | TOC, PPM of 10% Brine | % Moisture In Salt Cake |
|---|---|---|
| 0.00 | 167 | 1.1 |
| 0.061 | 60 | 1.2 |
| 0.116 | 36 | 1.7 |
| 0.158 | 27 | 1.1 |
| 0.212 | 20 | 1.3 |
| 0.264 | 19 | 1.4 |
| 0.315 | 19 | 1.3 |

The operating data for the crystallizer in the above three Examples are reproduced on Table VII for various times during the runs.

TABLE VII

FORCED CIRCULATION CRYSTALLIZER OPERATING DATA

|  | Example 1 | | Example 2 | | | Example 3 | | |
|---|---|---|---|---|---|---|---|---|
|  | After 13 hrs. | After 21 hrs. | After 7 hrs. | After 9 hrs. | After 2 hrs. | After 13 hrs. | After 20 hrs. | After 23 hrs. |
| Feed Temp. | 158 | 133 | 138 | 134 | 158 | 118 | 148 | 145 |
| Feed Sp.Gr. | 1.158 | 1.160 | 1.164 | 1.166 | 1.176 | 1.162 | 1.152 | 1.152 |
| Body Temp. °F | 141.0 | 140.6 | 138.8 | 139.4 | 138.4 | 139.1 | 141.3 | 141.2 |
| Htr. Exit Temp. | 145.8 | 145.4 | 143.8 | 144.4 | 144.0 | 144.4 | 146.4 | 146.4 |
| Evap. Sec/qt. | 16.0 | 16.4 | 15.8 | 16.5 | 15.8 | 16.0 | 16.0 | 16.8 |
| Evap. PPH | 469 | 457 | 475 | 455 | 475 | 468 | 468 | 447 |
| Discharge, Sec/qt. | 16.0 | 16.4 | 12.4 | 12.3 | 13.4 | 13.6 | 13.2 | 13.5 |
| Retention, Hrs. | 3.29 | 3.37 | 2.55 | 2.53 | 2.75 | 2.8 | 2.72 | 2.78 |

TABLE VII – Continued

FORCED CIRCULATION CRYSTALLIZER OPERATING DATA

| | Example 1 | | Example 2 | | Example 3 | | | |
|---|---|---|---|---|---|---|---|---|
| | After 13 hrs. | After 21 hrs. | After 7 hrs. | After 9 hrs. | After 2 hrs. | After 13 hrs. | After 20 hrs. | After 23 hrs. |
| % Settled Solids | 30 | 31 | 25 | 25 | 25 | 26 | 28 | 27 |
| gms. salt/liter slurry | 284 | 345 | 214 | 234 | 227 | 262 | 268 | 242 |
| % Amines, M.L. | 8.35 | 9.0 | 9.2 | 9.4 | 9.95 | 12.6 | 17.6 | 17.9 |
| Barometer, in Hg. | 29.1 | 29.0 | 28.5 | 28.53 | 28.6 | 28.75 | 28.85 | 28.91 |
| V.H. Pressure, in Hg. | 25.16 | 25.16 | 24.84 | 24.84 | 24.84 | 24.95 | 25.18 | 25.18 |
| % Amine, Condensate | 0.31 | 0.31 | 0.43 | 0.43 | 0.52 | 0.49 | 0.90 | 0.92 |
| % NaOH M.L. | 0.87 | 0.92 | 0.82 | 0.76 | 0.80 | 0.71 | 1.17 | 0.80 |
| Ave. Particle Dia.MM | 0.24 | 0.31 | 0.37 | 0.31 | 0.26 | 0.30 | 0.32 | 0.30 |

It will be seen by the foregoing that the analysis of the sodium chloride crystals produced from the 9.3% and 17.2% by weight amine solutions showed that TOC values for a 10% brine solution, produced from these crystals, could be obtained well within a 50 ppm analysis with proper centrifuge washing. Analysis also demonstrated the effect of the wash leg in the crystallizer. When sodium chloride crystals were produced from 9.3 and 17.2% by weight amine solutions, the wash leg produced lower minimum TOC values, as well as requiring less centrifuge wash to obtain such values, when compared to operation without a wash leg.

The foregoing amply demonstrates the success of the improved process of this invention, whereby significant quantities of ethylene amines product can be recovered for sale from the salt produced in the ethylene amines process, and a salt prepared for disposal, which contains substantially no organic contamination.

From the foregoing description, many modifications and changes would become apparent to those skilled in the art without departing from the scope and spirit of the above-described and hereafter claimed invention.

I claim:

1. In a method for preparation of ethylene amines by the reaction of ethylene dichloride with ammonia followed by neutralization with sodium hydroxide, the improvement for effecting recovery of amines from salt removed from the reaction mixture which comprises:
   a. charging a salt contaminated with ethylene amines product to a crystallizer in the form of an aqueous solution;
   b. removing water from said crystallizer in an overhead stream to form an aqueous slurry of salt crystals;
   c. centrifuging the crystallized salt while washing with water to produce a filtrate and a salt cake;
   d. recovering the filtrate stream containing ethylene amines; and
   e. recovering the salt cake being substantially free of ethylene amines contamination.

2. The method of claim 1 wherein the salt is washed in the centrifuge with water wherein from about 0.03 to about 0.35 pounds of water is used per pound of salt.

3. The process of claim 1 wherein the charge entering the crystallizer enters a wash leg containing salt crystals and flows countercurrent in said wash leg to the flow of crystallized salt to wash amine from said salt crystals with said charge.

4. The method of claim 1 wherein a portion of the aqueous slurry from the crystallizer is mixed with the filtrate from the centrifuge and recycled to the crystallizer.

5. The method of claim 4 wherein a portion of the recycle stream is charged to a cyclone separator which further removes salt from the recycle stream producing a salt-poor overhead solution and a salt-rich bottoms slurry; and recovering the salt-poor stream containing ethylene amines.

6. The process of claim 5 wherein a plurality of crystallizers is used and the salt-poor stream from the cyclone serves as the charge for each succeeding recrystallizer and the last such salt-poor stream being recovered.

7. The process of claim 1 wherein the overhead water stream from the crystallizer is mixed with the amine-contaminated salt to form the charge for the crystallizer.

8. The process of claim 1 wherein the salt cake from the centrifuge is mixed with water to produce a brine solution substantially free of amine contamination.

* * * * *